(12) United States Patent
Shih et al.

(10) Patent No.: US 8,465,194 B2
(45) Date of Patent: Jun. 18, 2013

(54) BACKLIGHT MODULE, LIGHT GUIDE PLATE THEREOF AND INK THEREOF

(75) Inventors: Hsi-Hsin Shih, Tainan County (TW);
Hung-Wen Wang, Tainan County (TW);
Chin-Ming Wang, Tainan County (TW);
Chien-Tsung Wu, Tainan County (TW);
Shao-Ming Lee, Tainan County (TW)

(73) Assignee: Chi Lin Optoelectronics Co., Ltd., Tainan (TW)

( * ) Notice: Subject to any disclaimer, the term of this patent is extended or adjusted under 35 U.S.C. 154(b) by 416 days.

(21) Appl. No.: 12/947,140

(22) Filed: Nov. 16, 2010

(65) Prior Publication Data

US 2011/0199785 A1 Aug. 18, 2011

Related U.S. Application Data

(60) Provisional application No. 61/303,829, filed on Feb. 12, 2010.

(51) Int. Cl.
*F21V 7/04* (2006.01)

(52) U.S. Cl.
USPC ..... 362/624; 362/627; 427/163.1; 427/163.2; 385/129; 524/556; 524/570

(58) Field of Classification Search
USPC ............... 362/618, 622, 624, 627; 385/129; 427/163.1–163.4; 523/400; 524/556, 570, 524/590, 606
See application file for complete search history.

(56) References Cited

U.S. PATENT DOCUMENTS

| | | | |
|---|---|---|---|
| 7,535,642 B2 * | 5/2009 | Toshima et al. | 359/588 |
| 7,572,483 B2 * | 8/2009 | Hasei | 362/627 |
| 2006/0268571 A1 * | 11/2006 | Harada et al. | 362/618 |

* cited by examiner

*Primary Examiner* — Stephen F Husar
(74) *Attorney, Agent, or Firm* — WPAT, P.C.; Anthony King

(57) ABSTRACT

The present invention relates to a backlight module, light guide plate thereof and ink thereof. The ink includes a base resin and an additive. The additive is dispersed in the base resin for increasing the printability of the ink. The additive comprises a polymer having hydroxy functional group, ester functional group, ether functional group or combination thereof. Use of the ink of the present invention will reduce the color difference and the variation of color temperature of the light guide plate. In addition, the ink has higher flowability, which increases the printability of the ink.

20 Claims, 2 Drawing Sheets

BACKLIGHT MODULE, LIGHT GUIDE PLATE THEREOF AND INK THEREOF

CROSS-REFERENCE TO RELATED APPLICATIONS

This application claims the benefit of U.S. Provisional Patent Application No. 61/303,829 filed Feb. 12, 2010.

BACKGROUND OF THE INVENTION

1. Field of the Invention

The present invention relates to a backlight module, light guide plate thereof and ink thereof, and more particularly to an ink comprising a polymer having hydroxy functional group, ester functional group, ether functional group or combination thereof, and backlight module and light guide plate including the same.

2. Description of the Related Art

FIG. 1 shows a schematic view of a conventional backlight module. The backlight module 1 includes a light source 11, a reflector 12, a light guide plate 13 and a diffusion film 16. The light source 11, for example, a plurality of LEDs or CCFLs, is used to provide a light beam. The reflector 12 is disposed below the light guide plate 13, and is used to reflect part of the light beam back to the light guide plate 13.

The light guide plate 13 is used to receive and mix the light beam from the light source 11. The light guide plate 13 includes a light guide plate body 14 and an ink 15. The light guide plate body 14 has a first surface 141, a second surface 142 and a side surface 143. The first surface 141 is opposite the second surface 142, and the side surface 143 is adjacent to the first surface 141 and the second surface 142. The light source 11 faces the side surface 143, so that the light beam enters the light guide plate body 14 through the side surface 143 and is then transmitted to the diffusion film 16 through the second surface 142. The material of the light guide plate body 14 is transparent polymer, for example, polymethyl methacrylate (PMMA) or polycarbonate (PC).

The ink 15 is printed on the first surface 141 of the light guide plate body 14 to form a pattern, so as to reflect the light beam back to the interior of the light guide plate body 14. The ink 15 includes a base resin, a plurality of fillers and an additive. The material of the base resin is epoxy resin, polyester resin, acrylic resin, polyvinyl resin, polyamide resin or polyurethane resin. The fillers are fine particles that are dispersed in the base resin for diffusing light. The additive is dispersed in the base resin for increasing the printability of the ink 15.

Since the material of the fillers and the additive are inorganic, for example, silica, the backlight module 1 has drawbacks such as high color difference and high variation of color temperature. Usually, the color difference measured between points on the surface of a panel 17 above the diffusion film 16 is greater than 0.01. Such phenomenon will become more obvious when the optical path length of the light beam is longer.

Therefore, it is necessary to provide a light guide plate and ink thereof to solve the above problems.

SUMMARY OF THE INVENTION

The present invention is directed to an ink which comprises a base resin and an additive. The additive is dispersed in the base resin for increasing the printability of the ink and comprises a polymer having hydroxy functional group, ester functional group, ether functional group or combination thereof.

The present invention is further directed to a light guide plate which comprises a light guide plate body and an ink. The light guide plate body has a first surface. The ink is disposed on the first surface of the light guide plate body so as to reflect a light beam back to the interior of the light guide plate body. The ink comprises a base resin and an additive. The additive is dispersed in the base resin for increasing the printability of the ink and comprises a polymer having hydroxy functional group, ester functional group, ether functional group or combination thereof.

Use of the ink of the present invention will reduce the color difference and the variation of color temperature and increase the average brightness of the light guide plate or backlight module. In addition, the ink of the present invention further has higher flowability, which increases the printability of the ink.

The present invention is further directed to a backlight module, which comprises a light source, a light guide plate, a reflector and a diffusion film. The light source is used for providing a light beam. The light guide plate is the abovementioned light guide plate. The reflector is disposed below the light guide plate, and is used to reflect part of the light beam back to the light guide plate. The diffusion film is disposed above or on the light guide plate, and is used to diffuse the light beam from the second surface of the light guide plate body.

DETAILED DESCRIPTION OF THE INVENTION

Figure 2:
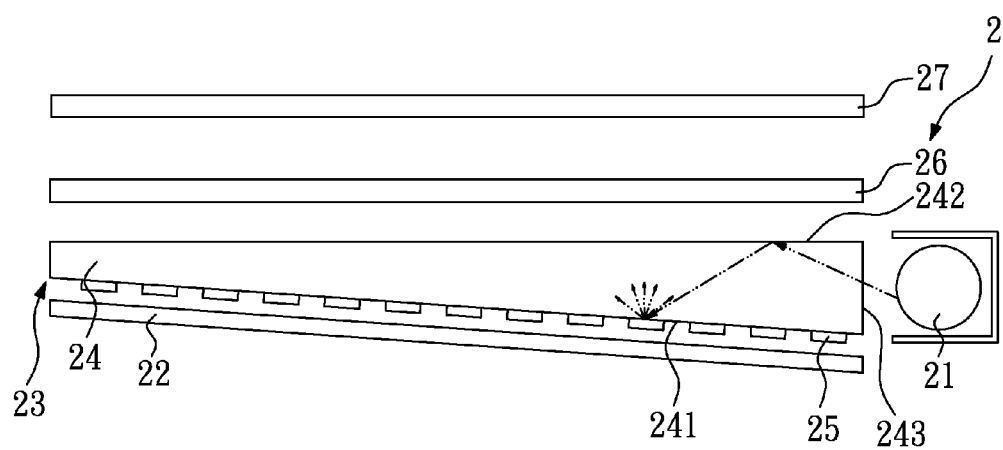
FIG. 2 is a schematic view of a backlight module according to an embodiment of the present invention.

FIG. 2 shows a schematic view of a backlight module according to an embodiment of the present invention. The backlight module 2 is an edge-lighting backlight module, which comprises a light source 21, a reflector 22, a light guide plate 23 and a diffusion film 26. The light source 21, for example, a plurality of LEDs or CCFLs or a combination thereof, is used to provide a light beam. The reflector 22 is disposed below the light guide plate 23, and is used to reflect part of the light beam back to the light guide plate 23.

The light guide plate 23 is used to receive and mix the light beam from the light source 21. The light guide plate 23 comprises a light guide plate body 24 and an ink 25. The light guide plate body 24 has a first surface 241, a second surface 242 and a side surface 243. The first surface 241 is opposite the second surface 242, and the side surface 243 is adjacent to the first surface 241 and the second surface 242. The light source 21 faces the side surface 243, so that the light beam enters the light guide plate body 24 through the side surface 243 and is then transmitted to the diffusion film 26 through the second surface 242. The material of the light guide plate body 24 is transparent polymer, preferably polymethyl methacrylate (PMMA), arcylic-based polymer, polycarbonate (PC), polyethylene terephthalate (PET) or polystyrene (PS) or a copolymer thereof.

The ink 25 is disposed on the first surface 241 of the light guide plate body 24 to form a pattern, so as to destroy the total reflection of the light beam and reflect the light beam back to the interior of the light guide plate body 24. Preferably, the ink 25 is printed on the first surface 241. The ink 25 comprises a base resin, a plurality of fillers and an additive. The base resin comprises at least one selected from the group consisting of epoxy resin, polyester resin, acrylic resin, polyvinyl resin, polyamide resin, polyurethane resin, a copolymer thereof and a combination thereof. The fillers are fine particles that are dispersed in the base resin for diffusing light, and the fine particles are polymeric (PMMA or PS) or inorganic. Preferably, the amount of the fillers is 5 to 20 weight % of the ink.

The additive is dispersed in the base resin for increasing the printability of the ink, and comprises a polymer having hydroxy functional group, ester functional group, ether functional group or combination thereof. The chemical structure of the polymer of the additive has a branch structure, a brush structure or a star structure. The polymer can be polyether polyol or polyester polyol. The polyether polyol is selected from the group consisting of poly(ethylene oxide) (PEO), poly(ethylene glycol) (PEG), poly(tetramethylene oxide) (PTMO) and poly(tetramethylene glycol) (PTMG). The molecular weight of the polyester polyol is 300 to 10,000 g/mole. Preferably, the amount of the additive is 0.5 to 30 weight % of the ink. More preferably, the amount of the additive is 0.5 to 15 weight % of the ink. In the embodiment, the additive comprises polymer only. That is, the additive does not contain silica. However, in other applications, the additive may comprises polymer and a little silica.

The diffusion film 26 is disposed above or on the light guide plate 23, and is used to diffuse the light beam from the second surface 242 of the light guide plate body 24.

As shown in Table 1 below, the maximum color difference and color temperature difference in the CIE 1931 color space, and the average brightness measured at nine points on the surface of panels 17, 27 above the diffusion films 16, 26 is shown. The $x_{max}$ is the maximum chromaticity among the points in the CIE 1931 color space, and the $x_{min}$ is the minimum chromaticity among the points in the CIE 1931 color space. The $y_{max}$ is the maximum chromaticity among the points in the CIE 1931 color space, and the $y_{min}$ is the minimum chromaticity among the points in the CIE 1931 color space. $T_{max}$ is the maximum color temperature among the points in the CIE 1931 color space, and $T_{min}$ is the minimum color temperature among the points in the CIE 1931 color space. The average brightness is the average brightness of the nine points.

TABLE 1 comparison of optical effect caused by ink with silica additive of prior art and ink with PEG additive only of the present invention.

| additive of the ink | $\Delta x$ ($x_{max} - x_{min}$) | $\Delta y$ ($y_{max} - y_{min}$) | $\Delta T$ ($T_{max} - T_{min}$) (K) | average brightness (cd/m$^2$) |
|---|---|---|---|---|
| Silica (prior art) | 0.0077 | 0.0129 | 1390 | 379 |
| PEG only (present invention) | 0.0043 | 0.0038 | 620 | 383 |

Figure 1:
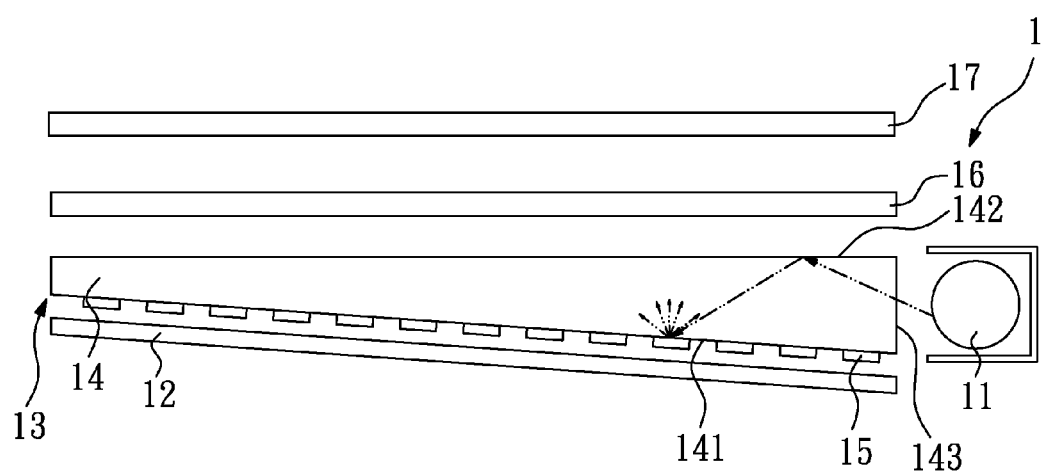
FIG. 1 is a schematic view of a conventional backlight module.

As shown in the table 1, compared with the light guide plate 14 having the ink 15 with silica additive in prior art (FIG. 1), the light guide plate 24 having the ink 25 with PEG additive in the present invention (FIG. 2) has lower color difference, lower variation of color temperature and higher average brightness. In addition, the ink 25 of the present invention has higher flowability, which increases its printability.

In the embodiment, the ink 25 is disposed on the first surface 241 of the light guide plate body 24. However, it is understood that the ink 25 may be further disposed on the second surface 242 of the light guide plate body 24. That is, the ink 25 may be disposed on one side or both sides of the light guide plate body 24.

While several embodiments of the present invention have been illustrated and described, various modifications and improvements can be made by those skilled in the art. The embodiments of the present invention are therefore described in an illustrative but not restrictive sense. It is intended that the present invention should not be limited to the particular forms as illustrated, and that all modifications which maintain the spirit and scope of the present invention are within the scope defined in the appended claims.

What is claimed is:

1. An ink comprising:
   a base resin; and
   an additive, dispersed in the base resin for increasing the printability of the ink, and comprising a polymer having hydroxy functional group, ester functional group, ether functional group or combination thereof.

2. The ink as claimed in claim 1, wherein the base resin comprises at least one selected from the group consisting of epoxy resin, polyester resin, acrylic resin, polyvinyl resin, polyamide resin, polyurethane resin, a copolymer thereof and a combination thereof.

3. The ink as claimed in claim 1, wherein the polymer of the additive is polyether polyol or polyester polyol.

4. The ink as claimed in claim 3, wherein the polyether polyol is selected from the group consisting of poly(ethylene oxide) (PEO), poly(ethylene glycol) (PEG), poly(tetramethylene oxide) (PTMO) and poly(tetramethylene glycol) (PTMG).

5. The ink as claimed in claim 3, wherein the molecular weight of the polyester polyol is 300 to 10,000 g/mole.

6. The ink as claimed in claim 1, wherein the amount of the additive is 0.5 to 30 weight % of the ink.

7. The ink as claimed in claim 1, wherein the amount of the additive is 0.5 to 15 weight % of the ink.

8. The ink as claimed in claim 1, further comprising a plurality of fine particles dispersed in the base resin for diffusing light, the fine particles being polymeric or inorganic.

9. The ink as claimed in claim 1, wherein the chemical structure of the polymer of the additive has a branch structure, a brush structure or a star structure.

10. A light guide plate comprising:
    a light guide plate body, having a first surface; and
    an ink disposed on the first surface of the light guide plate body, the ink comprising:
       a base resin; and
       an additive, dispersed in the base resin for increasing the printability of the ink, and comprising a polymer having hydroxy functional group, ester functional group, ether functional group or combination thereof.

11. The light guide plate as claimed in claim 10, wherein the material of the light guide plate body is polymethyl methacrylate (PMMA), arcylic-based polymer, polycarbonate (PC), polyethylene terephthalate (PET), polystyrene (PS) or a copolymer thereof.

12. The light guide plate as claimed in claim 10, wherein the base resin comprises at least one selected from the group consisting of epoxy resin, polyester resin, acrylic resin, polyvinyl resin, polyamide resin, polyurethane resin, a copolymer thereof and a combination thereof.

13. The light guide plate as claimed in claim 10, wherein the polymer of the additive is polyether polyol or polyester polyol.

14. The light guide plate as claimed in claim 13, wherein the polyether polyol is selected from the group consisting of poly(ethylene oxide) (PEO), poly(ethylene glycol) (PEG), poly(tetramethylene oxide) (PTMO) and poly(tetramethylene glycol) (PTMG).

15. The light guide plate as claimed in claim 13, wherein the molecular weight of the polyester polyol is 300 to 10,000 g/mole.

16. The light guide plate as claimed in claim 10, wherein the amount of the additive is 0.5 to 30 weight % of the ink.

17. The light guide plate as claimed in claim 10, wherein the amount of the additive is 0.5 to 15 weight % of the ink.

18. The light guide plate as claimed in claim 10, wherein the ink further comprises a plurality of fine particles dispersed in the base resin for diffusing light, the fine particles being polymeric or inorganic.

19. The light guide plate as claimed in claim 10, wherein the chemical structure of the polymer of the additive has a branch structure, a brush structure or a star structure.

20. A backlight module comprising:
a light source, for providing a light beam;
a light guide plate, for receiving and mixing the light beam from the light source, the light guide plate comprising:
  a light guide plate body, having a first surface and a second surface; and
  an ink disposed on the first surface of the light guide plate body, the ink comprising:
    a base resin; and
    an additive, dispersed in the base resin for increasing the printability of the ink, and comprising a polymer having hydroxy functional group, ester functional group, ether functional group or combination thereof;
a reflector, disposed below the light guide plate, and being used to reflect part of the light beam back to the light guide plate; and
an diffusion film, disposed above or on the light guide plate, and being used to diffuse the light beam from the second surface of the light guide plate body.

* * * * *